United States Patent [19]

Novikov

[11] Patent Number: 4,878,706

[45] Date of Patent: Nov. 7, 1989

[54] ANTI-THEFT SYSTEM

[76] Inventor: Eduard Novikov, 209 Avenue "P", Apt. C10, Brooklyn, N.Y. 11204

[21] Appl. No.: 236,537

[22] Filed: Aug. 25, 1988

[51] Int. Cl.$^4$ .............................................. B60R 7/00
[52] U.S. Cl. ................................. 296/37.1; 296/37.6; 296/76; 224/42.42
[58] Field of Search ...................... 296/37.1, 37.6, 76; 224/42.42 R

[56] References Cited

U.S. PATENT DOCUMENTS

| 3,473,680 | 10/1969 | Downer | 296/37.1 |
| 4,050,767 | 9/1988 | Berning | 439/298 |
| 4,227,737 | 10/1980 | Vogt | 296/76 |
| 4,361,355 | 11/1982 | Wise et al. | 296/37.1 |
| 4,596,418 | 6/1986 | Koh | 296/76 |

Primary Examiner—Robert R. Song
Attorney, Agent, or Firm—Bauer & Schåffer

[57] ABSTRACT

There is disclosed an anti-theft system for protecting a vehicle radio or the like, which is manually removably disposed on the instrument panel or dashboard of a vehicle such as an automobile. When not in use, the radio is stored in a container provided with locks, the container being disposed in the vehicle near the rear compartment or trunk which is also provided with a locked cover. Thus, a thief must open not only the trunk cover, but also the container for storing the radio which itself cannot be removed from the trunk.

19 Claims, 2 Drawing Sheets

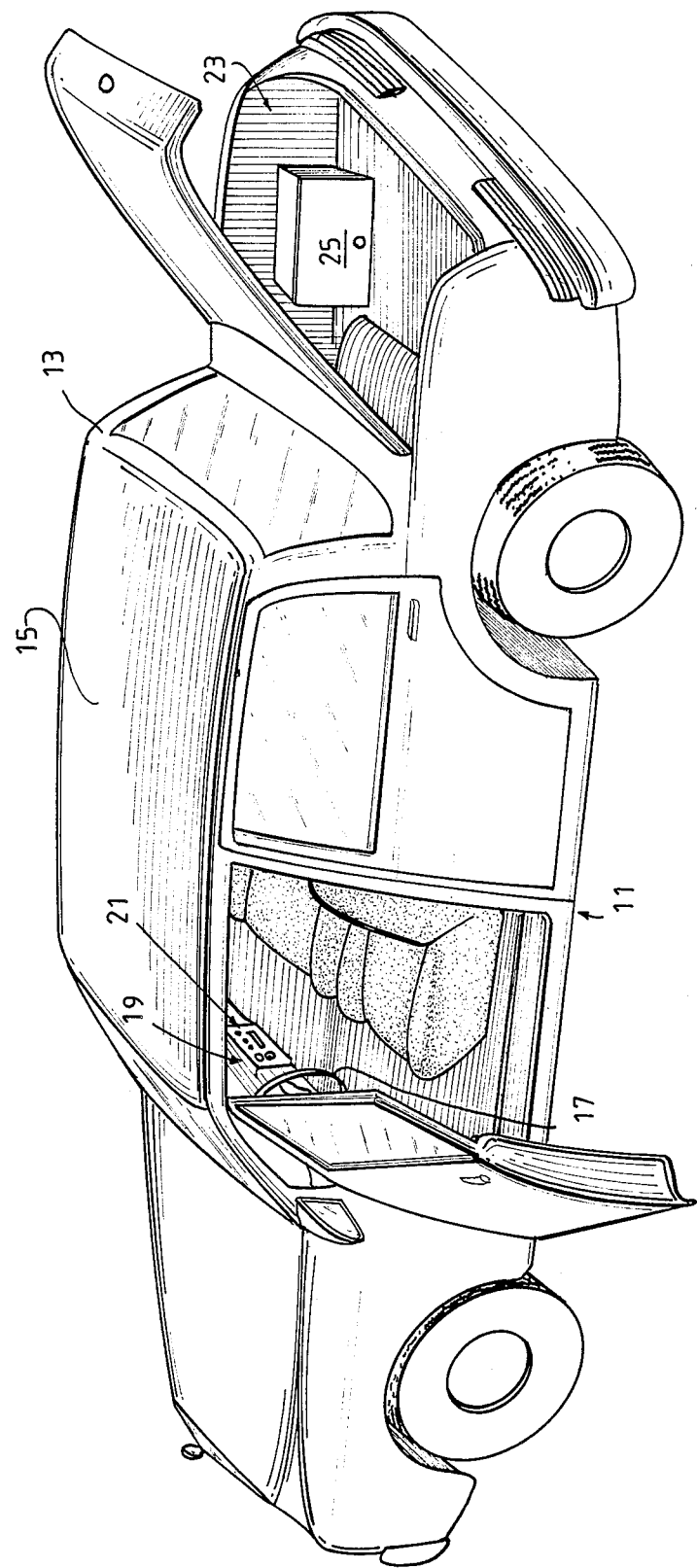

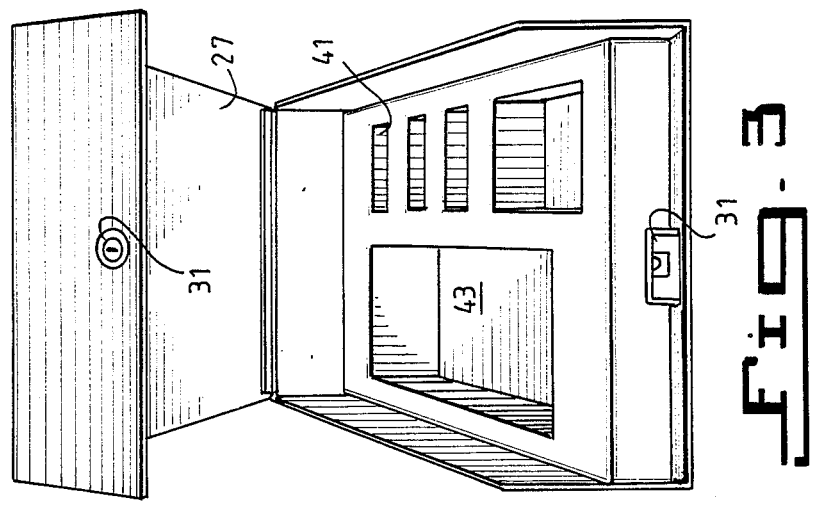
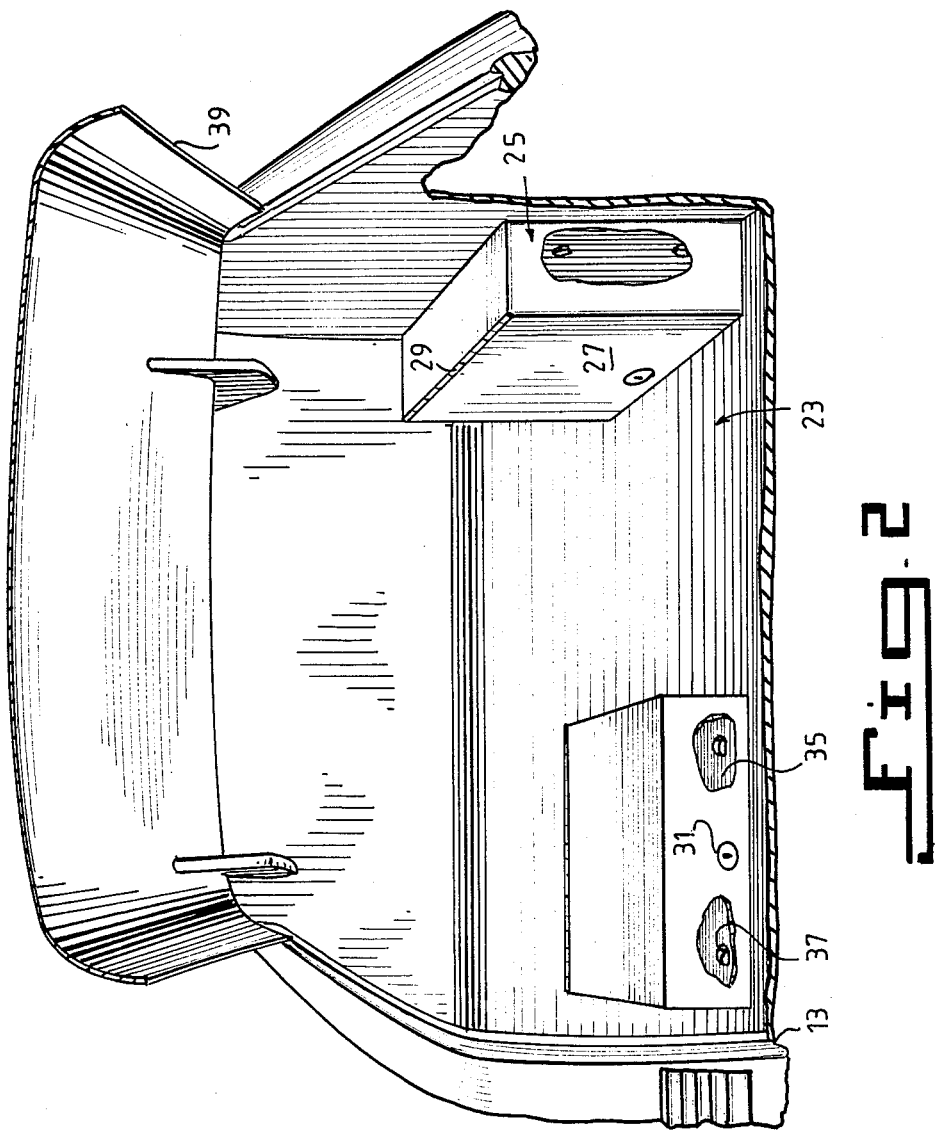

ANTI-THEFT SYSTEM

The present invention relates to an anti-theft system. More particularly, the invention relates to an anti-theft system for protecting and preventing theft of communication means, such as for example, a stereo, radio and tape deck combination as well as other valuables from a vehicle, such as for example, an automobile.

BACKGROUND OF THE INVENTION

Anti-theft devices and mounts for preventing theft of and the destruction of valuable automobile accessories such as citizens band radios, stereo radios, tape decks, telephones, and the like are known. For example, U.S. Pat. No. 4,050,767 Berning, discloses a mount for detachably installing a citizens band radio in an automobile so that it may be removed from its position of use and stored in the locked trunk of the car. U.S. Pat. 4,361,355 Wise, on the other hand, discloses a special secure compartment, or box, mounted in the truck of a car to receive traffic violations and tickets from the outside of the trunk without opening the trunk.

U.S. Pat. No. 4,124,815 Stoeschek, discloses mounting a radio in an automobile rather than in the drives compartment for reasons of storage space. U.S. Pat. No. 4,248,069 Burbank, discloses apparatus for protecting and preventing theft of dashboard or instrument panel mounted radios which include a cover which may be disposed over the operable portions of the radio and locked in place. In contrast, in U.S. Pat. No. 4,481,512 Tscheulin et al, discloses a theft resistant audio system for a vehicle part of which is permanently fixed in the dashboard thereof and includes a user interface unit pluggable into and removable from the front of the permanently fixed post to render the system unuseable when the interface unit is removed.

However, none of the above discussed patents teach or suggest a system or device for the safe containment of a communication means, such as a radio or the like, in a container or box integrally secured to a vehicle frame or bulkhead inside the vehicle trunk. There exists, therefore, a need for such a system or device. The present invention fulfills such a need.

BRIEF SUMMARY OF THE INVENTION

In accordance with the invention, there is provided an anti-theft system for protecting and preventing theft of communication means for a vehicle comprising, in combination, a vehicle having a frame, a vehicle body supported on the frame, means for operating the vehicle and an instrument panel located in the vehicle body, communication means removably disposed for use in the vehicle body at one location, and storage means for receiving and storing said communication means. The storage means including lock means is permanently fixed to the vehicle at a location different from the location of the communication means when the communication means is removed from the location where it is used, thereby protecting and preventing theft of the communication means.

In particular, the storage means comprises a permanently attached locked box within the trunk. The box is preferably welded in place and therefor cannot be removed.

For the sake of simplicity, the present invention is disclosed here as it is applied to automobiles. It is to be understood, however, the inventive system can be utilized in aircraft, boats, ships, trucks and other types of vehicles.

THE DRAWINGS

In order to describe the inventive anti-theft system of the present invention more fully, reference is directed to the accompanying drawings which are to be taken in conjunction with the following detailed description thereof and in which drawings:

FIG. 1 is a partial sectional view in prospective of an automobile showing a stereo, radio and tape deck combination removably disposed in the instrument panel, the position for its use, and the container for receiving and storing the stereo, radio and tape deck, located in the rear compartment or trunk of the automobile in accordance with the system of the present invention;

FIG. 2 is a partial lateral plan view of the automobile of FIG. 1 showing the rear compartment or trunk with the lid open and the container for receiving the stereo, radio and tape deck closed and locked and mounted in the trunk and permanently fixed to the frame; and FIG. 3 is a partial lateral plan view showing the interior of the container of FIG. 2.

DESCRIPTION OF THE PREFERRED EMBODIMENTS

Referring now to FIG. 1, an anti-theft system for protecting and preventing theft of valuable automobile accessories according to the present invention, comprises a vehicle such as an automobile generally designated by numeral 11 having a frame 13, an automobile vehicle body 15 and means for operating a vehicle, such as steering apparatus 17 and an instrument panel 19, on dashboard, located in the body 15.

Removably disposed in the instrument panel 19 is an illustrated valuable such as a stereo radio, tape deck combination 21. The valuable may be a citizen band radio transceiver or any small FM radio, telephone, or other communication means removably mounted on the instrument panel 19 or in the vicinity of the steering apparatus 17 with a suitable bracket means, such as those shown, for example, in the above-mentioned U.S. Pat. No. 4,050,767.

Mounted in the rear compartment of trunk 23 of the automobile 11 is container 25 for receiving and storing the stereo, radio, tape deck combination 21, or the like, when it is not in use. Container 25 is provided with a cover 27 hinged thereto as with a secure and safe piano hinge 29 and is provided with one or more locks 31. The locks may be of any conventional type although it is preferred that a strong tamper-proof combination lock or safety lock be used. The container 25 may be disposed in an upright position or it may be disposed flat on the bottom 33 of the trunk 23 in flat condition both as seen in FIG. 2.

Preferably, the container is arranged so that the lock 31 is close to the floor, bulkhead, or other permanent structural element so that it is inaccessible to all but the owner using the key or combination tumbler of the lock, thereby preventing the lock from being easily picked or pried apart by a thief. Container 25 may be attached to the bulkhead 35 of the automobile body 15 by welding as shown, or it may be attached, as for example to the bottom 33 of the trunk 23 by means of bolts 37.

In actual use, the anti-theft system for protecting and preventing theft of the valuable accessory such as the stereo, radio, tape deck combination operates by removing the radio and tape deck from its position on the instrument panel when it is not in use and locking it in the container 25, after which the trunk lid 39 is closed and locked. The valuable is permitted to so remain until it is again to be used and is protected against theft.

Since the lid 39 of the automobile must first be pried open by a thief in order to obtain access to container 25 which cannot be removed from the trunk since it is permanently fixed to a bulkhead of the body on the frame, the thief is thwarted in his desire to make a quick hit and escape. Consequently, a thief must first break the lid open, then break the locks of the container 25 to gain access to the valuable stored therein. The difficulty in gaining access through the trunk and locked container is discouraging to the thief. Moreover, the time and effort needed to gain access to the unit by breaking the automobile trunk and then the container will often be sufficiently long for the thief to be caught in the act.

In FIG. 3, the interior of the container is illustrated to show that it has been separated into a number of smaller compartments 41 and 43. One compartment 43 may be sufficiently large to contain major accessories such as the radio, tape deck, etc.; another compartment can be sized to receive the connecting wires thereof and minor components. Still other compartments may be used to contain jewelry and other valuables. The division of the container can be predetermined and selected to fit the need of the vehicle owner.

It is to be understood that the present invention is not to be limited to the described embodiments thereof except as defined in the appended claims.

What is claimed is:

1. An anti-theft system for protecting and preventing theft of valuable accessories for a vehicle comprising, in combination, a vehicle having a frame, a vehicle body supported on said frame, means for operating said vehicle and an instrument panel located in said body, and an accessory removably disposed for use in said vehicle body at one location, and storage means for receiving and storing said accessory, said storage means comprising a parallelepiped container having a cover, including lock means, said container being permanently fixed to said vehicle in the trunk thereof remote from the location where it is used, thereby protecting and preventing theft of said accessory.

2. An anti-theft system as defined in claim 1 wherein the vehicle is an automobile.

3. An anti-theft system as defined in claim 1 wherein the accessory is a citizen band radio transceiver.

4. An anti-theft system as defined in claim 1 wherein the accessory is a stereo radio receiver.

5. An anti-theft system as defined in claim 1 wherein the accessory is a combined stereo radio receiver and tape deck.

6. An anti-theft system as defined in claim 1 wherein the accessory is removably disposed for use in the instrument panel.

7. An anti-theft system as defined in claim 1 wherein the vehicle is an automobile, the accessory is a combined stereo radio receiver and tape deck removably disposed for use in the instrument panel and the storage means is a container adapted to receive and store said combined stereo radio receiver and tape deck when it is removed from said instrument panel and said container is permanently fixed to the frame of said automobile.

8. An anti-theft system for protecting and preventing theft of communication means from a vehicle comprising, in combination, a vehicle having a frame, a vehicle body supported on said frame, means for operating said vehicle and an instrument panel located in said vehicle body near one end thereof and a storage compartment including closure means and locking means located in said vehicle body near the opposite end thereof, said communication means removably disposed for use in said instrument panel, and a container for receiving and storing said communication means, when it is removed from said instrument panel, including locking means located in said storage compartment and permanently fixed to said vehicle body, thereby protecting and preventing theft of said communication means.

9. An anti-theft system as defined in claim 8 wherein the vehicle is an automobile.

10. An anti-theft system as defined in claim 8 wherein the communication means is a combined stereo radio receiver and tape deck.

11. An anti-theft system as defined in claim 8 wherein the container is permanently fixed to the vehicle body by welding.

12. An anti-theft system as defined in claim 8 wherein the container is permanently fixed to the vehicle body by bolts.

13. An anti-theft system for protecting and preventing theft of communication means from a vehicle comprising, in combination, an automobile having a frame, an automobile body supported on said frame, means for operating said automobile and an instrument panel located in said automobile body near one end thereof and a storage compartment including closure means and locking means located in said automobile body near the opposite end thereof, said communication means removably disposed for use in said instrument panel, and a container for receiving and storing said communication means when it is removed from said instrument panel, including locking means located in said storage compartment and permanently fixed to said automobile body, thereby protecting and preventing theft of said communication means.

14. An anti-theft system as defined in claim 13 wherein the communication means is a combined stereo radio receiver and tape deck.

15. An anti-theft system as defined in claim 13 where the container is permanently fixed to the automobile body by welding.

16. An anti-theft system as defined in claim 13 wherein the container is permanently fixed to the automobile body by bolts.

17. An anti-theft system for protecting and preventing theft of valuable accessories from a vehicle comprising in combination a vehicle having a frame, vehicle body supported on the frame including a trunk for the normal storage of the spare tire, baggage and the like, and storage means for receiving and storing said accessories, said storage means comprising a parallelopiped container having a cover and lock means for securing said cover to said container, said container being permanently fixed to the frame of said body in the trunk thereof and being accessible for receiving and storing said accessories ao as to protect and prevent a theft thereof.

18. An anti-theft system according to claim 17 wherein said container is provided with a plurality of recesses, each adapted to receive a selected accessory or group thereof.

19. The anti-theft system according to claim 1 wherein said container is provided with a plurality of pockets or recesses, each pocket being adpted to receive and hold therein respective accessories or valuables.

* * * * *